3,429,899
OXYGEN CONTAINING HETEROCYCLIC ETHERS
Alexander D. Cross, Mexico City, Mexico, and John A. Edwards, Palo Alto, and Belig Berkoz, Los Altos, Calif., assignors to Syntex Corporation, Panama, Panama, a corporation of Panama
No Drawing. Filed Feb. 28, 1966, Ser. No. 530,368
U.S. Cl. 260—345.7        12 Claims
Int. Cl. A61k 27/00; C07d 5/04

ABSTRACT OF THE DISCLOSURE

Ortho-tetrahydrofuran-2'-yloxy benzoate and ortho-tetrahydropyran-2'-yloxy benzoate salts and esters with optional hydroxymethyl or acyloxymethyl ω-substitution of the tetrahydrofuran or tetrahydropyran moiety and/or acetamido substitution of the benzoate moiety exhibit analgesic and antipyretic activity.

This invention relates to novel organic compounds. More particularly, this invention pertains to oxygen containing heterocyclic ethers having the formula:

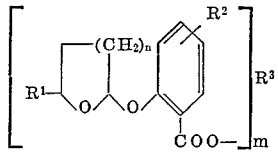

wherein $R^1$ is hydrogen, hydroxymethyl or acyloxymethyl;
$R^2$ is hydrogen or acetamido;
$R^3$ is a metal cation, lower alkyl, phenyl or aralkyl containing up to 8 carbon atoms and optionally containing one or two halogeno, hydroxy or acetoxy groups;
$n$ is an integer having a value of one or two;
$m$ is an integer having a value of from one to three inclusively, $m$ having the same value as the valence of the metal cation and $m$ being one in all other cases.

The term "acyloxymethyl" includes groups containing up to 8 carbon atoms and the acyl portion may be derived from a saturated or unsaturated and branched or straight chain hydrocarbon carboxylic acid. Typical groups thus include acetoxymethyl, acrylyloxymethyl, butyryloxymethyl, trimethylacetoxymethyl, and the like.

The group $R^3$ may be a pharmaceutically acceptable, nontoxic cation of a metal such as potassium, sodium, calcium, aluminum, magnesium or the like, or may be a monovalent organic radical such as a lower alkyl group from 1 to 6 carbon atoms, e.g. methyl, ethyl, propyl, isopropyl, butyl and the like, a phenyl group or an aralkyl group such as benzyl or phenylethyl, as well as substituted derivatives thereof such as hydroxyethyl, acetoxyethyl, diacetoxyethyl, fluorophenyl, chlorophenyl, trifluoromethylphenyl, acetoxyphenyl and the like.

The novel compounds of the present invention are analgesics and anti-pyretics and are thus useful in the treatment of pain and fever. They may be administered orally in standard pharmaceutical compositions and at dosages appropriate for the particular condition being treated.

The compounds of the present invention are prepared in accordance with the following reaction scheme:

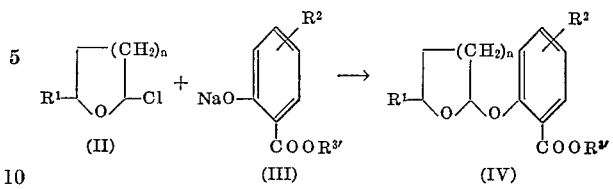

wherein $R^1$, $R^2$ and $n$ are as defined above and
$R^{3'}$ is lower alkyl, phenyl or aralkyl containing up to eight carbon atoms, and optionally containing one or two halogeno, hydroxy or acetoxy groups.

Thus a chloro compound of Formula II is treated at from about 20 to 35° C. with a sodium phenoxide derivative of Formula III to afford the novel ethers of Formula IV. In the practice of the process, the reaction is performed in an inert, non-aqueous, organic solvent such as benzene, tetrahydrofuran, diethyleneglycoldimethyl ether or the like. In addition, an inert atmosphere of nitrogen is generally maintained above the reaction mixture. The sodium phenoxide derivatives (III) may be obtained for example, by treatment of a substituted phenol with an excess of sodium hydride in an inert solvent. Other alkali metal phenoxides may be used and prepared from the corresponding alkali metal hydrides, such as potassium and lithium.

Compounds of Formula I wherein $R^3$ is a metal cation are prepared by basic hydrolysis of the compounds of Formula IV. This hydrolysis reaction is performed for a period of several hours at from about 20 to about 35° C. in an aqueous solution of an alkali metal hydroxide in a water-miscible solvent such as methanol, ethanol, dioxane, tetrahydrofuran or the like. The pH of the mixture is subsequently adjusted to 10, as for example with an ion-exchange resin, to afford the sodium, potassium, salts of Formula I which are isolated by conventional techniques, for example by freeze drying.

In the case of those salts wherein $R^3$ is a di- and trivalent metal this hydrolysis reaction is preferably performed with ammonium hydroxide, and the reaction intermediate then allowed to react with a stoichiometric amount of the metal hydroxide, e.g. a one half molar amount of a divalent metal hydroxide such as calcium or magnesium hydroxides or one-third of a molar amount of a trivalent metal hydroxide such as aluminum hydroxide. This product is then isolated via conventional techniques, for example removal of solvent under reduced pressure.

The following examples are set forth to illustrate but are not intended to limit the scope of the present invention.

EXAMPLE 1

To a slurry of 16.0 g. of sodium hydride in 50 ml. of dry diethyleneglycol dimethyl ether under an inert nitrogen atmosphere is added 21.2 g. of methyl salicylate in a dropwise fashion over a period of 20 minutes. The mixture is allowed to stand at 20–35° C. for 40 minutes. To this mixture is then added 17.5 g. of 2-chlorotetrahydropyran in a dropwise fashion over a period of 10 minutes. The mixture is allowed to stand at 25–30° C. for an additional 30 minutes and then slowly added to ice water. The organic phase is extracted with ether, dried and evaporated to yield methyl 2-tetrahydropyranyloxybenzoate.

Utilizing the above procedure, other esters of salicylic acid, namely the ethyl, isopropyl, n-amyl, t-butyl, phenyl, 2′-acetoxyethyl, 4′-acetoxybenzyl, 2′-3′-diacetoxyglyceryl, 2′-3′-dichloroglyceryl, 4′-fluorophenyl, benzyl, 2′-hydroxyethyl, 4′-iodobenzyl, methyl 3-acetamido, and ethyl 5-acetamido esters afforded the following 2-tetrahydropyranyloxybenzoates of the present invention, namely ethyl 2-tetrahydropyranyloxybenzoate,
isopropyl 2-tetrahydropyranyloxybenzoate,
n-amyl 2-tetrahydropyranyloxybenzoate,
t-butyl 2-tetrahydropyranyloxybenzoate,
phenyl 2-tetrahydropyranyloxybenzoate,
2′-acetoxyethyl 2-tetrahydropranyloxybenzoate,
4′-acetoxybenzyl 2-tetrahydropyranyloxybenzoate,
2′,3′-diacetoxyglyceryl 2-tetrahydropyranyloxybenzoate,
2′,3′dichloroglyceryl 2-tetrahydropyranyloxybenzoate,
4′-fluorophenyl 2-tetrahydropyranyloxybenzoate,
benzyl 2-tetrahydropyranyloxybenzoate,
2-hydroxyethyl-2-tetrahydropyranyloxybenzoate,
4′-iodobenzyl 2-tetrahydropyranyloxybenzoate,
methyl 2-tetrahydropyranyloxy-4-acetamidobenzoate,
and ethyl 2-tetrahydropyranyloxy-5-acetamidobenzoate.

EXAMPLE 2

Utilizing the procedure of Example 1, but substituting an equivalent amount of 2-chlorotetrahydrofuran for the 2-chlorotetrahydropyran, there are obtained the corresponding 2-tetrahydrofuryloxybenzoic acid esters namely, methyl 2-tetrahydrofuryloxybenzoate,
ethyl 2-tetrahydrofuryloxybenzoate,
isopropyl 2-tetrahydrofuryloxybenzoate,
n-amyl 2-tetrahydrofuryloxybenzoate,
t-butyl 2-tetrahydrofuryloxybenzoate,
phenyl 2-tetrahydrofuryloxybenzoate,
2′-acetoxyethyl 2-tetrahydrofuryloxybenzoate,
4′-acetoxybenzyl 2-tetrahydrofuryloxybenzoate,
2′,3′-diacetoxyglyceryl 2-tetrahydrofuryloxybenzoate,
2′,3′-dichloroglyceryl 2-tetrahydrofuryloxybenzoate,
4′-fluorophenyl 2-tetrahydrofuryloxybenzoate,
benzyl 2-tetrahydrofuryloxybenzoate,
2′-hydroxyethyl 2-tetrahydrofuryloxybenzoate,
4′-iodobenzyl 2-tetrahydrofuryloxybenzoate,
methyl 2-tetrahydrofuryloxy-4-acetamidobenzoate,
and ethyl 2-tetrahydrofuryloxy-5-acetamidobenzoate.

EXAMPLE 3

Utilizing the procedure of Example 1 but substituting an equivalent amount of 2-chloro(6-hydroxymethyl)-tetrahydropyran for the 2-chlorotetrahydropyran there are obtained the corresponding 2-(6-hydroxymethyl)tetrahydropyranyloxybenzoic acid esters, namely, methyl 2-(6-hydroxymethyl)tetrahydropyranyloxy-benzoate;
ethyl 2-(6′-hydroxymethyl)tetrahydrodropyranyloxy-benzoate;
isopropyl 2-(6′-hydroxymethyl)tetrahydropyranyloxy-benzoate;
n-amyl 2-(6′-hydroxymethyl)tetrahydropyranyloxy-benzoate;
t-butyl 2-(6′-hydroxymethyl)tetrahydropyranyloxy-benzoate;
phenyl 2-(6′-hydroxymethyl)tetrahydropyranyloxy-benzoate;
2′-acetoxyethyl 2-(6′-hydroxymethyl)tetrahydropyranyl-oxybenzoate;
4′-acetoxybenzyl 2-(6′-hydroxymethyl)tetrahydropyranyl-oxybenzoate;
2′,3′-diacetoxyglyceryl 2-(6′-hydroxymethyl)tetrahydro-pyranyloxybenzoate;
2′,3′-dichloroglyceryl 2-(6′-hydroxymethyl)tetrahydro-pyranyloxybenzoate;
4′-fluorophenyl 2-(6′-hydroxymethyl)tetrahydropyranyl-oxybenzoate;
benzyl 2-(6′-hydroxymethyl)tetrahydropyranyloxy-benzoate;
2′-hydroxyethyl 2-(6′-hydroxymethyl)tetrahydropyranyl-oxybenzoate;
4′-iodobenzyl 2-(6′-hydroxymethyl)tetrahydropyranyl-oxybenzoate;
methyl 2-(6′-hydroxymethyl)tetrahydropyranyloxy-4-acetamidobenzoate;
and ethyl 2-(6′-hydroxymethyl)tetrahydropyranyloxy-5-acetamidobenzoate.

EXAMPLE 4

Utilizing the procedure of Example 1 but substituting an equivalent amount of 2-chloro-6-acetoxymethyltetrahydropyran for the 2-chlorotetrahydropyran there are obtained the corresponding 2-(6′-acetoxymethyl)tetrahydropyranyloxy benzoic acid esters, namely, methyl 2-(6′-acetoxymethyl)tetrahydropyranyloxy-benzoate;
ethyl 2-(6′-acetoxymethyl)tetrahydropyranyloxy-benzoate;
isopropyl 2-(6′-acetoxymethyl)tetrahydropyranyloxy-benzoate;
n-amyl 2-(6′-acetoxymethyl)tetrahydropyranyloxy-benzoate;
t-butyl 2-(6′-acetoxymethyl)tetrahydropyranyloxy-benzoate;
phenyl 2-(6′-acetoxymethyl)tetrahydropyranyloxy-benzoate;
2′-acetoxyethyl 2-(6′-acetoxymethyl)tetrahydropyranyl-oxybenzoate;
4′-acetoxybenzyl 2-(6-acetoxymethyl)tetrahydropyranyl-oxybenzoate;
2′,3′-diacetoxyglyceryl 2-(6′-acetoxymethyl)tetrahydro-pyranyloxybenzoate;
2′-3′-dichloroglyceryl 2-(6′-acetoxymethyl)tetrahydro-pyranyloxybenzoate;
4′-fluorophenyl 2-(6′-acetoxymethyl)tetrahydro-pyranyloxybenzoate;
benzyl 2-(6′-acetoxymethyl)tetrahydropyranyloxy-benzoate;
2′-hydroxyethyl 2-(6′-acetoxymethyl)tetrahydropyranyl-oxybenzoate;
4′-iodobenzyl 2-(6′-acetoxymethyl)tetrahydropyranyl-oxybenzoate;
methyl 2-(6-acetoxymethyl)tetrahydropyranyloxy-4-acetamidobenzoate;
and ethyl 2-(6′-acetoxymethyl)tetrahydropyranyloxy-5-acetamidobenzoate.

In a similar process, other 2-chloro-6-acyloxymethyl-tetrahydropyrans yield the corresponding 2-(6′-acyloxymethyl) derivatives of the present invention.

EXAMPLE 5

To a solution of 35.5 g. of methyl 2-tetrahydropyranyl-oxybenzoate in 100 ml. of methanol at 0° C. is added in a dropwise fashion a solution of 30 g. of sodium hydroxide in 30 ml. of water. An additional 600 ml. of methanol is added to the mixture which is then allowed to stand at 25–30° C. for several hours. Traces of organic material are extracted with ether. The pH of the aqueous phase is adjusted to 10.0 with an ion exchange resin acid cycle (Dowex 50W–X8). Freeze drying of the solution affords sodium 2-tetrahydropyranyloxybenzoate which can be recrystallized from water:tetrahydrofuran.

Utilizing the same procedure other sodium salts of the present invention are prepared. Notably among these are the following: sodium 2-tetrahydropyranyloxy-4-acetamidobenzoate, sodium 2-tetrahydropyranyloxy-5-acetamidobenzoate, sodium 2-tetrahydrofuryloxybenzoate, sodium 2(6'-hydroxymethyl)tetrahydropyranyloxybenzoate, sodium 2-(6'-acetoxymethyl)tetrahydropyranyloxybenzoate.

Utilizing the above procedure but substituting potassium hydroxide for the sodium hydroxide, there are obtained the corresponding potassium salts.

EXAMPLE 6

A solution of 35.5 g. of methyl 2-tetrahydropyranyloxybenzoate, 100 ml. of ammonium hydroxide, 100 ml. of methanol, and 600 ml. of dioxane is allowed to stand at 20–35° C. for several days. The mixture is then concentrated to a small volume by removal of solvent under reduced pressure, allowed to react with one-half molar amount of calcium hydroxide and then evaporated to dryness to yield calcium 2-tetrahydropyranyloxybenzoate.

Utilizing the same procedure other calcium salts of the present invention are prepared. Notably among these are the following: calcium 2-tetrahydrofuryloxybenzoate, calcium 2 - (6'-caproyloxymethyl)tetrahydropyranyloxybenzoate, calcium 2-(6'-hydroxymethyl)tetrahydropyranyloxybenzoate, calcium 2-tetrahydropyranyloxy-4-acetamidobenzoate, and calcium 2-tetrahydropyranyloxy-5-acetamidobenzoate.

Utilizing the above procedure but substituting magnesium hydroxide for the calcium hydroxide, there are obtained the corresponding magnesium salts.

Utilizing the above procedure but substituting one-third molar amount of aluminum hydroxide for the one-half molar amount of calcium hydroxide, there are obtained the corresponding aluminum salts. Notably are the following: aluminum 2-tetrahydropyranyloxybenzoate, aluminum 2-(6'-hydroxymethyl)tetrahydropyranyloxybenzoate, aluminum 2-tetrahydrofuryloxybenzoate, aluminum 2-tetrahydropyranyloxy-4-acetamidobenzoate and aluminum 2-tetrahydropyranyloxy-5-acetamidobenzoate.

What is claimed is:
1. A compound having the formula:

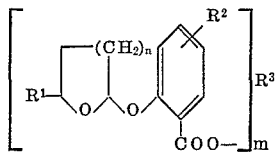

wherein $R^1$ is hydrogen, hydroxymethyl or hydrocarbon carboxylic acyloxymethyl of less than 8 carbon atoms;
$R^2$ is hydrogen or acetamido;
$R^3$ is a metal cation, lower alkyl, phenyl or aralkyl containing up to 8 carbon atoms and optionally containing one or two halogeno, hydroxy or acetoxy groups;
$n$ is an integer having a value of one or two;
$m$ is an integer having a value of from one to three, inclusively, $m$ having the same value as the valence of the metal cation and $m$ being one in all other cases.

2. A compound according to claim 1 wherein each of $R^1$ and $R^2$ is hydrogen; and $R^3$ is a metal cation.

3. A compound according to claim 2 wherein $R^3$ is calcium; and each of $n$ and $m$ is two.

4. A compound according to claim 2 wherein $R^3$ is aluminum; $n$ is two; and $m$ is three.

5. A compound according to claim 2 wherein $R^3$ is sodium; $n$ is two; and $m$ is one.

6. A compound according to claim 1 wherein each of $R^1$ and $R^2$ is hydrogen; $R^3$ is alkyl, phenyl or benzyl containing up to 8 carbon atoms and optionally substituted with one or two halogeno, hydroxy or acetoxy groups; and $n$ is two.

7. A compound according to claim 6 wherein $R^3$ is methyl.

8. A compound according to claim 6 wherein $R^3$ is phenyl.

9. A compound according to claim 6 wherein $R^3$ is 2'-acetoxyethyl.

10. A compound according to claim 6 wherein $R^3$ is 2',3'-diacetoxyglyceryl.

11. A compound according to claim 6 wherein $R^3$ is 4'-acetoxybenzyl.

12. A compound according to claim 1 wherein $R^1$ is hydrogen; $R^2$ is 5-acetamido; $R^3$ is sodium; $n$ is two and $m$ is one.

References Cited

UNITED STATES PATENTS 2,234,615    3/1941    Alexander _____ 260—347.4

OTHER REFERENCES

Santucci et al., Jour. Amer. Chem. Soc., vol. 80, pp. 4537–9 (1958).

HENRY R. JILES, *Primary Examiner.*

J. M. FORD, *Assistant Examiner.*

U.S. Cl. X.R.

260—345.8, 347.3, 347.4, 999